Nov. 7, 1967    W. L. ALBRECHT ETAL    3,351,561
NON AQUEOUS SILICA SOLS AND METHOD FOR PREPARING SAME
Filed Jan. 9, 1961
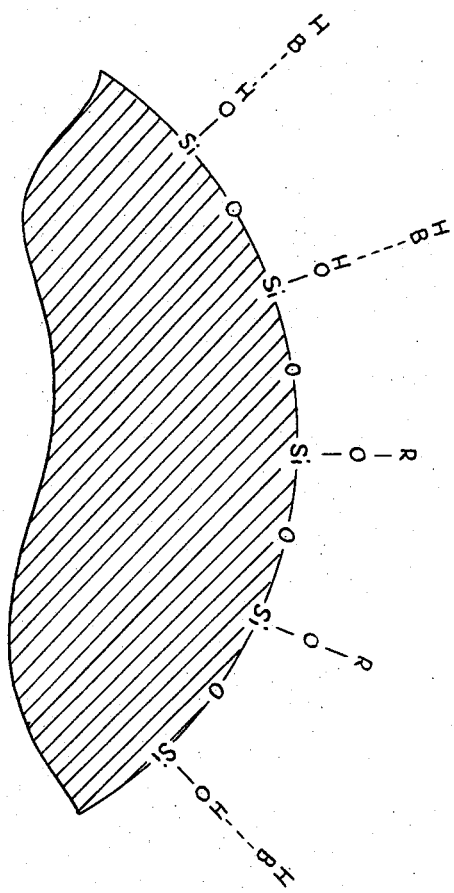
INVENTORS:
WILLIAM L. ALBRECHT
MORRIS MINDICK
BY *Marzall Johnston Cook & Root*
ATT'YS

3,351,561
NON-AQUEOUS SILICA SOLS AND METHOD FOR PREPARING SAME
William L. Albrecht, Naperville, and Morris Mindick, Chicago, Ill., assignors to Nalco Chemical Company, Chicago, Ill., a corporation of Delaware
Filed Jan. 9, 1961, Ser. No. 81,474
11 Claims. (Cl. 252—309)

This invention relates to a method for preparing non-aqueous silica sols. It also relates to novel non-aqueous silica sols which comprise chemically modified particles of colloidal silica dispersed in certain organic liquids.

Numerous methods have been proposed for dispersing colloidal particles of silica into various types of organic systems. In the recent volume, "The Colloidal Chemistry of Silica and Silicates," by Ralph K. Iler, Cornell University Press 1955, there are described methods for dispersing colloidal silica into organic liquids.

In one method, it is pointed out by Iler that Marshall, in U.S. Patents, 2,433,776, 2,433,777, 2,433,778, 2,433,779 and 2,433,780 has prepared so-called organosols by neutralizing an alkali metal silicate with an acid and then adding to the neutralized product a low molecular weight alcohol to cause precipitation of the salt formed by neutralization. The precipitated salt is removed by filtration and the water is then removed by distillation. Lastly, various organic liquids are then combined with the alcoholic sol.

Such processes require multi-step operations thereby making their commercialization difficult. The sols produced in accordance with the Marshall patents have the further disadvantages of being relatively dilute with respect to their silica content.

Another method described by Iler for dispersing silica into organic liquids resides in the hydrolysis of ethyl silicate using a mineral acid which is removed from the reaction mass using a precipitant such as silver oxide. Such processes have not achieved any industrial success.

In recent years it has been shown that finely divided silica may be reacted with certain alcohols to produce esterified silica products, commonly referred to as "Estersils." These products comprise silica particles whose surfaces contain organophilic and hydrophobic coatings. Products of this type are capable of being dispersed in several types of organic liquids. Typical examples of these products are the compositions described in Iler U.S. 2,657,149. A careful reading of this patent shows that while a variety of silicious materials may be esterified with alcohols, it is necessary to follow a definite preparative technique. It is always necessary to use substantially anhydrous silicious materials which are then reacted under critical conditions.

In Iler U.S. Patent 2,801,185 there is shown a method of preparing finely divided colloidal silica dispersed in organic liquids. The process uses aqueous silica sols as starting materials. However, it is necessary to work with dilute sols and to carry out several reaction stages before the end products are produced. Attempts to execute the process of Patent No. 2,801,185 using a relatively concentrated aqueous silica sol as a starting reagent, result in precipitation of silica particles during the process. Even though the systems remain substantially liquid throughout the reaction, the number of steps required and the conditions specified make the production of the products, from a commercial standpoint, not too desirable.

If it were possible to make colloidal silica dispersible in organic systems of various types by simply and directly converting aqueous silica sols to colloidal dispersions of silica in organic liquids a notable advantage would be afforded to the art. Also of benefit to many areas of chemical technology would be colloidal silica products which were compatible with a wide range of other organic materials, and which could be simply produced.

If products of the type described above were available it would be possible to utilize colloidal silica in the preparation of water repellant coatings for a variety of surfaces such as textiles, plastics, rubber, and the like.

In addition to providing such coatings, non-aqueous silica sols would find application in the formulating of various types of lubricating oils and greases. They could be used as fillers for specialized rubber products and as mold release agents in both the rubber and plastics industries. They would have further use in the prevention of plugging and sticking of plastic films if they were either incorporated with or applied to such films. They would be of particular interest as thickening agents for certain organic systems. An important application for these products would be specialized frictionalizing applications, particularly in the area of improving the coefficient of friction between sliding or rolling metal objects. The use of colloidal silica as a frictional improving agent is discussed at length in Luvisi, U.S. 2,787,968.

It therefore becomes an object of the invention to provide a simple method of dispersing colloidal silica in organic liquids.

Another object is to provide non-aqueous silica sols which are easily prepared and which are readily dispersible in a wide range of organic liquids.

A specific object of the invention is to provide non-aqueous silica sols which contain a relatively large amount of silica.

A further object is to provide substantially water-free organic liquids which contain dispersed therein colloidal particles of silica.

An important object is to furnish a method of directly utilizing relatively concentrated aqueous silica sols in the production of products of the type described.

Other objects will appear hereinafter.

The invention will be better understood by reference to the drawing which consists of an enlarged diagrammatic cross-section of a particle in a typical silica sol of the invention.

*The process*

In the broadest aspects of the invention non-aqueous silica sols may be prepared by charging a reaction system with an aqueous salt-free silica sol and a water miscible organic hydrogen bonding agent. The hydrogen bonding agent is added to the aquasol in sufficient amounts to protect the surface by later forming hydrogen bonds with at least 50% of the surface silanol groups of the silica particles, after the water has been removed.

The reaction system is placed under a vacuum and a water miscible alcohol is slowly added to the system. During the course of the addition, the reaction system is slowly heated while maintaining the vacuum, in order to substantially remove all the water from the system itself. It is necessary to add the water miscible alcohol in an amount at least equal to the volume of the water present in the aqueous salt-free silica sol. The temperature necessary to complete the water removal is directly proportional to the absolute pressure of the system. The total distillation time is dependent upon the rate of heating. If a system is under a sufficiently low pressure, the water is quickly removed without resorting to high temperature. If the water forms an azeotrope with the specific water miscible alcohol employed, it may be necessary to use a greater volume of alcohol than is otherwise necessary under non-azeotropic conditions. An important aspect of the invention is the maintenance of vacuum during the continuous addition of alcohol. The low temperature used to provide complete removal of water from the aqueous silica sol employed as a starting reagent, coupled with the use of the hydrogen bonding agent which provides a protective solvent shell around the silica particles, prevents gel formation or precipitation. The hydrogen bonding agent may help to protect the particles from agglomerating at the temperatures employed. However, the addition of this agent before the water removal process is not essential. The relatively high vacuum reduces the temperature necessary to drive off water thereby reducing the probability of condensation of the silanol groups which results in precipitation.

After substantially all the water is removed, the vacuum upon the system is released. Then the salt-free organosol is partially esterified by raising the temperature of the organosol to the boiling point of the alcohol now present as the continuous phase. The organosol is maintained at the distillation point of the alcohol in order to partially esterify the silanol particles contained in the sol itself and remove water from the system. The amount of esterification is dependent upon the time of reflux and the temperature, the latter facts being limited by the boiling point of the alcohol employed at atmospheric pressures. While the amount of esterification may be increased by using a higher boiling alcohol and/or refluxing for many hours, under the limits of the invention the maximum percent of esterification is not more than 50%.

*The hydrogen bonding agents*

In order to provide a sufficiently strong solvent shell during the course of the reaction and particularly during the critical esterification step, it is necessary to employ as hydrogen bonding agents those compounds which have sufficiently high dipole moments and high dielectric constants.

It is believed the solvent shell protects uncharged silica particles, and prevents agglomeration and precipitation. Without the protective shell, condensation of silanol groups would occur through the formation of siloxane linkages between previously discrete particles. During the period between removal of the final traces of water from an unprotected sol and the attainment of a sufficient degree of esterification, the sol is particularly susceptible to agglomeration and precipitation through silanol condensation reactions. The silica particles when stripped of their protective layer of water must then be protected by a hydrogen bonding solvent shell. This prevents reaction-producing collision of the discrete particles with each other which is believed to cause subsequent gelation or precipitation.

Good hydrogen bonding substances that provide strong solvent shells must be composed of molecules with high dipole moments, high dielectric constants, a low hydrocarbon/polar group ratio and no self hydrogen bonding power. Those compounds which have high dipole moments of at least about 3.0 Debye units ($3 \times 10^{-18}$ e.s.u. cm.) and which have a relatively low number of carbon atoms per polar group have been found to be particularly desirable. Examples of these hydrogen bonding agents are dimethylformamide, tetramethylene sulfone, dimethylacetamide, N-acetylmorpholine, gamma butyrolactone, propylene carbonate, nitromethane, nitroethane, and cyclopentanone. Preferred hydrogen bonding agents are those with dipole moments over 3.5 Debye units. Among these are dimethylacetamide, dimethylformamide and gamma butyrolactone. The most preferred hydrogen bonder with respect to availability, performance and cost is dimethylformamide.

Table No. 1 below lists some common hydrogen bonding agents and their respective dipole moments in Debye units.

TABLE 1

| Hydrogen bonding agent: | Dipole moment (Debye units) |
|---|---|
| Tetramethylene sulfone | 4.4 |
| Dimethylacetamide | 3.8 |
| Dimethylformamide | 3.8 |
| N-acetylmorpholine | 3.8 |
| γ-Butyrolactone | 4.1 |
| Propylene carbonate | 4.1 |
| Nitromethane | 3.1 |
| Nitroethane | 3.2 |
| Cyclopentanone | 3.0 |

*The starting silica sols*

In preparing the non-aqueous silica sols of the invention, it is necessary to start with aqueous colloidal silica sols. To insure stability and maximum silica concentrations in the finished products, it is desirable that the starting aqueous silica gels contains silica particles which are dense, amorphous, and have an average particle diameter which does not exceed 150 millimicrons.

Preferred aqueous colloidal silica sols may be conveniently prepared by utilizing the teachings of Bird, U.S. 2,244,325. This patent teaches the treatment of dilute alkali metal silicate solutions with cation exchange resins in the hydrogen form to remove substantially all the alkali metal from the silicate. The products produced by the Bird ion exchange method are most frequently dilute, e.g., 1–4% by weight solutions of colloidal silica. Since sols of this type are too dilute to be economically utilized in the processes of the invention, it is expedient that they be concentrated to a point whereby the silica concentration is between about 5% and 60% by weight silica expressed as $SiO_2$. Several methods have been described for conveniently concentrating silica sols of the type produced by Bird, U.S. 2,244,325. In particular, reference may be made to U.S. Patents 2,574,902, 2,601,235, 2,680,721 and 2,929,790. By using the teachings of these patents, which effectively employ a constant volume evaporation technique, it is possible to produce aqueous colloidal silica sols which have silica concentrations ranging between 20% and 40% by weight. These concentrations are desirable for use in the practices of this invention.

While sols of the above type are useful as starting materials in conducting the reactions which are hereinafter more fully set forth, it is an important concept of the invention that the aqueous silica sols be further treated, to insure stability of the system after addition of organic liquids.

When producing aqueous silica sols of the type described, for instance, in Bechtold et al. U.S. 2,574,902, it is necessary to stabilize the sols by adjusting the silica to alkali metal ratio, expressed as $SiO_2Na_2O$, so that it is at most 130:1 and preferably in the range from 70:1 to 100:1. The alkali metal containing sols are not compatible with organic systems due to the fact that the salt causes gelation or precipitation of the silica particles. This "salting-out" effect cannot be prevented even by the use of hydrogen bonding agents in the exchange of alcohol for the water of an aqueous silica sol. To prevent this, it is therefore necessary that these cations be removed from the surface of the colloidally dispersed silica particles. This may be readily accomplished by treating typical silica sols of the type described in Bechtold et al. U.S. 2,574,902, with a cation exchange resin in the hydrogen form and a strong base anion exchange resin in the hydroxide form. This treatment tends to produce a finished silica sol which we prefer to call "salt free." The particles of silica in such a sol are also considered as being "salt free."

Typical commercially available silica sols which may be deionized as described above to give starting materials that may be modified are those silica sols which are sold by the Nalco Chemical Company under the tradename of "Nalcoag." The physical and chemical properties of these types of silica sols, prior to deionization, are set forth below in Table II.

TABLE II

|  | Sol I | Sol II | Sol III |
| --- | --- | --- | --- |
| Percent colloidal silica as $SiO_2$ | 30 | 35–36 | 49–50 |
| pH | 10.2 | 8.6 | 9.0±0.1 |
| Viscosity at 77° F., cps | <5 | <5 | 20–30 |
| Specific gravity at 68° F | 1.205 | 1.255 | 1.385 |
| Average surface area, m.² per gram of $SiO_2$ | 190–270 | 135–190 | 120–150 |
| Average particle size, millimicrons | 11–16 | 16–22 | 20–25 |
| Density, lbs./gallon at 68° F | 10.0 | 10.5 | 11.6 |
| Freezing point, ° F | 32 | 32 | 32 |
| $Na_2O$, percent | 0.40 | 0.10 | 0.30 |

To illustrate the deionization of the above type sols, the following is presented by way of example.

EXAMPLE I

A silica sol corresponding to Sol No. II was decationized by passing the sol through a column of cation resin in the hydrogen form. The resin was Nalcite HCR which is described in U.S. Patent 2,366,007. Following this treatment, the silica sol was passed through a strong base anion exchange resin in the hydroxide form. In this instance, the resin was a commercially available product known as Nalcite SBR which is described in U.S. Patent 2,591,573.

It is estimated that the treated sol will have an approximate shelf life of three years at 75° F. Sols deionized in accordance with the above technique will have a pH within a range of 2.7 to 4.0, a specific conductivity of between 100 and 500 micromhos/cm. and when the silica concentration is between 5 and 50% by weight, their viscosities will range between 1 and 20 cps.

A comparison of the stability of the treated (deionized) sol and the stability of an identical sol that had not been deionized, when adjusted to various pH values with $H_2SO_4$ or NaOH, is set forth in the following table:

TABLE III

|  | pH | Stability | |
| --- | --- | --- | --- |
|  |  | 75° | 120° |
| Untreated Sol: |  |  |  |
| 1 | 1.0 | 1 month |  |
| 2 | 2.0 | do | 3 days. |
| 3 | 5.0 | 18 hours |  |
| 4 | 6.0 | do |  |
| 5 | 7.0 | 1 month | 2 days. |
| Treated Sol: |  |  |  |
| 1 | 1.0 | 2 months |  |
| 2 | 2.0 | 5 months | 17 days. |
| 3 | 5.0 | do |  |
| 4 | 6.0 | No viscosity increase after 5 months | 72 days. |
| 5 | 7.0 | do | Do. |

As is apparent from the table, the treated sol is stable under acid and neutral conditions, whereas the untreated sol is highly unstable under such conditions.

An important advantage derived by the use of a strong base anion exchanger in the hydrogen form in the deionization procedure described above is that the finished products are substantially free of $CO_2$ and low molecular weight forms of silicic acid. These deionized sols are extremely stable, thereby allowing them to be prepared and stored well in advance of the subsequent processes to which they are subjected in the steps of the invention. They have a salt content expressed as $Na_2SO_4$, of less than 0.001%.

When the particles sizes of the silica sols are within the ranges specified the silica particles present in the starting aqeuous sols will have surface areas of at least 20 m.²/g. with the surface areas being usually in excess of 120 m.²/g. The surface area is important since it directly relates to the number of available reactive silanol groups which require hydrogen bonding in the presence of water miscible alcohols.

Water miscible organic alcohols

The water miscible organic alcohols used in the processes of this invention are primary monohydric alcohols which may also contain an ether linkage. These alcohols act both as carriers for the silica particles after the initial step of removing the water, and also become the esterifying agents in the high temperature step of the reaction.

These water miscible alcoholic liquids have a boiling point greater than 50° C. with the preferred alcohols having a boiling point greater than 90° C. They may be characterized by the following structural formula:

$$RO-(CH_2CH_2O-)_nH$$

where R is an acylic hydrocarbon radical of from 1 to 4 carbon atoms in chain length and $n$ is an integer of from 0 to 1 in value, with the proviso that if $n$ is 0, R will contain no more than 3 carbon atoms.

Preferred alcohols corresponding to the structural formula are the well known "Cellosolve" alcohols. Examples of the Cellosolve type alcohols are 2-methoxy ethanol, 2-ethoxy ethanol, 2-propoxy ethanol and 2-butoxy ethanol. These latter compounds are better known as methyl Cellosolve, ethyl-Cellosolve, propyl-Cellosolve and butyl-Cellosolve. They may be generically classified as glycol ethers. These glycol ethers or Cellosolve compounds correspond to structural Formula No. 1 where $n$ is equal to 1 and the number of carbon atoms in R equals from 1 to 4. Of these the most preferable is 2-ethoxy ethanol.

The structural formula also corresponds to lower alkyl alcohols such as methanol, ethanol and n-propanol. Of these, the most preferred is n-propanol because of its higher boiling point which allows greater reactivity at a faster rate. A higher degree of esterification can be accomplished through the use of n-propanol than is possible with the use of the lower alkyl alcohols.

Specific reaction conditions

As generally outlined above, the hydrogen bonding agent is normally added to the aquasol before addition of the organic water miscible alcohol. While this is the preferred method of addition, stable organosols may also be produced by adding the hydrogen bonding agent directly to the water miscible alcohol, which mixture is in turn added to the aqueous silica sol. Stable sols also result from adding hydrogen bonding agent after addition of alcohol in replacement of water of an aqueous sol, but before esterification reaction and removal of final traces of water.

Again, while it is generally advantageous to add the alcohol to the reaction mixture of aquasol and hydrogen bonding agent at a slow and uniform rate, other methods of addition of the alcohol are not precluded. For example, the alcohol may be added batchwise or else added in one complete addition. In any event, it is greatly preferred that the exchange of the alcohol for the water as a carrier be effected under reduced pressures.

The amount of water miscible alcohol that may be added to the aquasol may vary from 1 to 7 volumes based on the volume of the aquasol. However, the more preferred amount of alcohol is from 1 to 3 volumes.

The use of a hydrogen bonding agent as a protective agent or a surface bonding solvent helps to obtain a surface modified sol with minimum loss of silica through precipitation. Hydrogen bonding agents with high dipole moments coupled with high dielectric constants tend to prevent agglomeration of the silica particles during the transition from an almost water-free silanol surface to an esterified surface. However, to give the best control of precipitation it is necessary that at this transition stage, all the surface silanol groups be completely protected by these hydrogen bonding agents. This is accomplished by the addition of the requisite amount of hydrogen bonding agent.

The amount of hydrogen bonding agent necessary to effect complete surface protection must be determined by the surface area of the dense spherical silica particles. It has been determined by Iler in, The Colloid Chemistry of Silica and Silicates, that the number of silanol (SiOH) groups at the surface of each particle is approximately equal to $8/m\mu^2$. A mol of surface silanol groups will contain Avogadro's number of SiOH groups. It is, therefore, readily determinable that there are $7.5 \times 10^4$ m.$^2$/mol SiOH by using the factor $10^{18}$ m$\mu^2$/m.$^2$. Thus, by relating the surface area required for every mol of SiOH to the known specific surface area of the sol we can determine for any sol by the following equation the volume in milliliters which will contain a mol of SiOH.

The equation employed to determine this is as follows:

$$\frac{\text{ml. sol}}{\text{mol SiOH}} = \frac{7.5 \times 10^4}{Sdf}$$

In the equation S is the specific surface area of the particle expressed as m.$^2$/g. (m.$^2$/g. = square meters per gram), $d$ is the density of the sol in g./ml. and $f$ is the weight fraction of SiO$_2$ particles in the sol.

Since the number of silanol groups per square millimicron has been determined to be independent of particle diameter, it is only necessary to determine by some means of measurement the specific surface area of the dense silica particle. For example, if this specific surface area is 140 m.$^2$/g. this figure may be inserted into the formula along with the measurements of the density of the sol and the percent of silica in the sol to determine the number of milliliters of sol which contains one mol of silanol groups. For example, a 35% aqueous sol with a specific gravity of 1.248 having a specific surface area of 140 m.$^2$/g. contains one mol of SiOH in every 1225 ml. of sol. Using this figure and assuming that in order to obtain complete coverage one must add 1 hydrogen bonding molecule per surface silanol group, it would be necessary to add 1 mol of a hydrogen bonding agent or its equivalent volume for every 1225 ml. of the aqueous sol having the physical constants enumerated above. For example, if the hydrogen bonding agent employed is dimethylformamide it would be necessary to add 73 grams or 77 milliliters of dimethylformamide for every 1225 ml. of an aqueous sol of the particular silica concentration, specific surface area, and sol density enumerated above.

The number of mols of hydrogen bonding agent per mol of SiOH may vary from 10:1 to 1:1. The most preferred ratio of hydrogen bonding agent to SiOH in mols is 2 to 1.

During the first step of addition of water miscible alcohol to the aquasol whereby the water is removed from the reaction system and replaced with the water miscible alcohol, the vacuum must be maintained at all times. The pressure employed may vary from 2 to 150 millimeters of mercury. The more preferred pressure range is from 5 to 100 millimeters of mercury and the most preferred range is from 5 to 20 millimeters of mercury.

While the water is being replaced by the water miscible alcohol under vacuum it is ordinarily necessary to apply heat to the reaction vessel. The temperatures necessary to remove substantially all the water from the system under the vacuum conditions usually employed may vary from 25 to 100° C. However, the most preferred temperature range during this step is from 30 to 70° C. The time involved to substantially remove all the water is directly dependent upon both the vacuum employed and the heating rate used to effect volatilization of the water. However, it has been found that essentially all the water may be removed during a period of from ¼ to 10 hours. However, under the preferred conditions of the reaction the water is almost completely removed in from ½ to 3 hours.

After the water has been removed from the reaction system, the vacuum is released and the reaction vessel is brought quickly to the reflux temperature of the water miscible alcohol. The reaction mixture is then refluxed at the boiling temperature of the water miscible alcohol. These temperatures may range from 50° to 170° C., but more preferably the reaction mixtures are boiled at from 130° to 160° C. The time of reflux may vary from ½ to 10 hours but it has been determined that the amount of esterification that is possible under the conditions of temperatures cited above is often completed after a reflux time of from 1 to 5 hours. With these conditions of temperature and time, the products of the invention contain colloidally dispersed silica particles which have not more than 50% of their surface silanol groups esterified with the same water miscible alcohol which corresponds to the continuous phase. The preferred products, however, have from 5% to 35% of their surface silanol groups esterified and correspondingly have 95% to 65% of their silanol groups protected by hydrogen bonding.

If the water miscible alcohol employed has a boiling point greater than the hydrogen bonding agent, some or all of the hydrogen bonding agent may be lost through volatilization in the esterification step. If this is done the organosol becomes cloudy and it is necessary to add sufficient amounts of additional hydrogen bonding agent to prevent precipitation and maintain stability of the alcoholic sol. Since the precipitation of silica ordinarily does not occur instantaneously, there is a period of time available for taking preventive measures. The hydrogen bonding agent may successfully be added after the water of the aquasol has been exchanged with the alcohol. Even after the sol has been esterified at temperatures which cause loss of hydrogen bonding agent, prompt replacement of the bonding agent will produce a stable final product.

If the newly invented partially esterified silica particles colloidally suspended in a water miscible alcohol, are dried by spray drying or other well known drying techniques, it is not possible to redisperse the dry silica particles in any organic media. This is evidence of the incomplete esterification of silica particles by the process here disclosed which produces an organosol having no more than 50% of its particle surface silanol groups esterified.

The drying of an alcoholic silica sol containing only partially esterified particles, causes the discrete particle units to agglomerate through siloxane (—Si—O—Si—) bridgings.

By drying, the alcoholic dispersion medium and the protective hydrogen bonding solvent shell are driven off, leaving unesterified reactive silanol groups on the surface of the particles free to react with each other to form tight cross-linking siloxane bonds. The hydrogen bond is relatively weak and as such will not persist through the drying step. The cross-linking however, does remain as tightly adherent bonds. It results in something similar to the irreversible gel formed upon drying of an aqueous silica sol. After cross-linking has occurred it becomes impossible to redisperse the linked particles in any liquid media, organic or aqueous. This type of reaction would not occur in the case of a substantially completely esterified particle. Total esterification would prevent cross-linking.

Products

The products of the invention are non-aqueous silica sols composed of a water miscible alcohol as the continuous phase and colloidal, amorphous, dense spherical particles of silica as the dispersed phase. These silica particles are essentially salt free and have approximately the same average particle diameter as the silica particles possessed before the hydrogen bonding and esterification reactions. These diameters may vary from 3 to 150 millimicrons. The specific surface area also remains the same, being at least 20 m.$^2$/g. During the course of reaction and subsequent to it there is negligible loss of silica through gelation and precipitation. This clearly points out the fact that little or no agglomeration occurs during the process and, consequently, the particles when seen in the electron microscope have essentially the same appearance that they possessed before being reacted upon.

The diagrammatic representation in the drawing of a discrete silica particle, as found in a silica sol prepared by the process in this case shows random distribution of silanol groups, some esterified and some hydrogen bonded. Since the hydrogen bonding agent remains in the organic sol, it helps to maintain the stability and prevent subsequent precipitation. While only some silanol groups are esterified, all silanol groups are masked since the hydrogen bonding agent remains in the final composition.

In the drawing, R refers to any hydrocarbon radical of the water miscible alcohol which was employed in the reaction. HB refers to the hydrogen bonding agent which is weakly bonded to the surface silanol groups. Each silanol group not esterified, is bound to these hydrogen bonding groups which protect the silica particle from precipitation by forming what is in effect a solvent shell. If in the early stages of the esterification process or in subsequent concentration of the partially modified sol, the solvent shell is broken by distillation of the hydrogen bonding agent, it is necessary to add additional organic hydrogen bonding agent to the system in order to prevent agglomeration and precipitation of silica particles.

In order to determine the amount of silica that has been lost by precipitation or otherwise in the preparation of a sol, the percent silica remaining in the final composition may be determined by the following formula:

$$\text{Percent SiO}_2 = \frac{2.3 \ (\text{Sp. Gr. Sol} - \text{Sp. Gr. Solvent}) \ 100}{(2.3 - \text{Sp. Gr. Solvent})(\text{Sp. Gr. Sol})}$$

Using this formula in conjunction with the weights of the starting and finished sol one can determine the amount of silica that has been lost by a simple subtraction. The weight of silica remaining in the alcohol sol is to be deducted from the weight of silica used as the reactant in the aquasol. Using the techniques and conditions of the invention little or no silica is lost during substitution of an aqueous media with a water miscible alcoholic media, and subsequent esterification.

*Examples*

In order that the invention may be better understood the following specific illustrative examples are given.

EXAMPLE II

The following is a preferred method of preparing a product of this invention. To a 10 liter, 3 necked flask, set up with stirrer, separatory funnel, and distilling column leading to a water cooled condenser were added 4.78 kilograms of a 35% aqueous silica sol. The silica particles had a specific surface area of 140 m.$^2$/g. and a specific gravity of 1.25. This aquasol may be prepared by any of the previously described methods of producing salt free aqueous silica sols. For operation under vacuum, the apparatus was attached through rubber tubing to a vacuum gauge and to a water aspirator. A pressure of 40 millimeters of mercury could be obtained in the apparatus.

The flask was then heated with a heating mantle controlled by a variable transformer. Ethyl-Cellosolve (2-ethoxy ethanol) solvent was added through the separatory funnel to maintain constant volume in the flask as solvent was distilled off under vacuum. The temperature leveled off at 57° C. (at a pressure of 40 mm. of mercury) after 6.3 kilograms of Cellosolve were added, indicating essentially complete removal of water. This amount was twice the weight of the water originally present i.e., two theoretical amounts of Cellosolve were added. There was negligible loss of silica through gelation and precipitation. The water content of the sol estimated from the normal boiling point of the finished sol and the specific gravity of the final distillate was less than 1%.

To the salt free alcohol sol was then added 456 grams of hydrogen bonding agent, dimethylformamide. The amount of dimethylformamide was theoretically equal to two mols of hydrogen bonding agent for every mol of surface silanol.

The alcohol sol or alcosol was then brought to the boiling point of the ethyl Cellosolve after releasing the vacuum and refluxed during 9 hours with minimum loss of ethyl-Cellosolve. Only a very minute amount of silica precipitated. Care was taken to avoid local overheating by maintaining at all times the pre-determined heating rate which gave the desired rate of reflux.

The degree of esterification may be determined according to methods detailed in above mentioned U.S. Patent No. 2,657,149. Determination may also be made by diluting a measured sample of finished sol to make a 1% aqueous solution and then titrating to end point with a 10% aqueous sodium hydroxide solution in the presence of phenolphthalein or methyl orange indicator. Determination by either of these methods shows finished sols produced by the process disclosed here, to have silica particles with from about 5 to about 50% of their surface silanol groups esterified.

The modified alcosol produced is stable in that it showed substantially no increase in relative viscosity when aged at 30° C. for 1 month.

The solvent shell formed by the hydrogen bonding agent, dimethylformamide, helped to protect the system from precipitation and gelation of silica during the partial esterification of the surface silanol groups by the alcohol. This is clearly shown by the negligible loss of silica of less than 1% during the course of the process.

EXAMPLE III

This example exemplifies the versatility of the process. The hydrogen bonding agent in this example is added before the water has been replaced by the water miscible alcohol, and before the modification of the silica particles has taken place. To a 5 liter, 3 necked flask, set up with a stirrer, separatory funnel, and distilling column leading to a water cooled condenser were added 4.78 kilograms of a 35% aqueous silica sol having a specific gravity of 1.25 and a specific surface area of 140 m.$^2$/g. Then 456 grams of dimethylformamide were added.

The flask was put under 28.4 inches of mercury vacuum and then heated with a "Thermowell" heater. Ethyl-Cellosolve was added through the separatory funnel to maintain constant volume in the flask. As water was distilled off under vacuum the temperature leveled off at 57° C., after 6.3 kilograms of the ethyl-Cellosolve were added. The amount of ethyl-Cellosolve added was twice the weight of the water originally present.

A 400 gram aliquot of this alcosol was taken and added to a 500 ml., 3 necked flask equipped with stirrer, with thermometer and with a vertical air condenser leading to a receiver. A thermometer was inserted at the top of the distilling column to determine the vapor temperature. The flask was heated with a heating mantle controlled by a variable transformer. The heating rate was such that the solvent refluxed with only a small amount distilling out of the reaction system. Then the reaction system was heated at the reflux temperature for 9 hours. Only a very small amount of silica precipitated, with a 99+ percent yield being recorded. The temperature was held at approximately 135° C., during the 9 hour period.

This example shows that while an important function of the hydrogen bonding agent is to protect the silica particles from agglomeration during removal of the final traces of water and during the initial stages of the esterification reaction, the hydrogen bonding agent may be added in the initial step of exchanging the water with alcohol without any deleterious effects.

EXAMPLE IV

In order to determine the effects of a process whereby the initial step is run at atmospheric conditions rather than under vacuum, the process of Example II was repeated with the only modification being that the exchange of alcohol for the water was effected at atmospheric pressure. The maximum temperature then was 100° C., before all the water could be substantially removed. The amount of Cellosolve added was equal to the weight of the water originally present. Only a 75% yield of silica could be obtained under these reaction conditions. The yield is calculated by dividing the weight of the silica in the final sol by the weight of the silica at the beginning of this experiment. The weight of silica may be determined from gravity measurements as outlined above.

This example shows that it is extremely critical to employ a vacuum during the first step of the process, namely the replacement of the aqueous phase with an organic phase.

EXAMPLE V

This example was run exactly the same as Example II with the exception that a nitrogen blanket was continuously introduced into the reaction system after the vacuum was replaced in order to eliminate any color produced from air oxidation. The esterification portion of the process involved refluxing the alcohol solvent for 3½ hours. The color was somewhat improved by using the nitrogen to eliminate air oxidation. A 97% yield was recorded from this experiment.

EXAMPLE VI

In order to determine the effect of the amount of hydrogen bonding agent added, this example was run similarly to Example II with the exception that only 278 grams of dimethylformamide were added rather than 456 grams. This amount of dimethylformamide would give a theoretically complete solvent shell coverage by a mol to mol hydrogen bonding effect of the dimethylformamide to the silanol groups.

The esterification step of the reaction was run at 135° C. for 4½ hours. At the end of the reaction a 95% yield was determined. This yield was slightly inferior to the yield recorded in Examples III and V, showing that superior results are obtained when the amount of hydrogen bonding agent employed is greater than the 1 to 1 theoretical mol ratio calculated.

EXAMPLE VII

This example shows the result of an experiment run without the use of any hydrogen bonding agent. A 500 gram aliquot of the unmodified alcohol sol of Example II was refluxed for 4½ hours without adding any hydrogen bonding agent during the esterification step. During the reaction it was necessary to add 100 milliliters of ethyl-Cellosolve to replace the materials lost through distillation. Formation of small gel particles was apparent on the sides of the flask shortly after refluxing started. The temperature at this time was 128° C. About ⅔ of the silica was lost as gel when the reaction was stopped. The final sol was turbid but uncolored.

This experiment vividly shows the critical necessity of employing a hydrogen bonding agent during the esterification reaction of the silica particles. It is not absolutely necessary to add the hydrogen bonding agent to the aqueous silica sol which is to be replaced with the water miscible alcohol. Gross amounts of silica are lost however, if the solvent shell protection afforded by the hydrogen bonding agent is not employed in the esterification process.

As mentioned above, one of the most interesting and distinguishing characteristics of the non-aqueous silica sols produced in accordance with the processes described in detail above is that once the silica has been dried from the continuous organic phase, it is not redispersible either in water or in the same or other similar organic liquids. This property is important when it is desirable to use the non-aqueous silica sols as coatings which might subsequently contact liquids.

Another important advantage of the compositions is that they may be concentrated to provide relatively high silica concentrations heretofore not accomplished. This concentration may be achieved by simple boiling, although most preferably the boiling is conducted by using a constant volume evaporation procedure. This constant volume evaporation is desirable since it tends to prevent any agglomeration of the particles from occurring during concentration.

The organo-sol products of the invention are compatible with many organic liquids and to that end are capable of being incorporated into a wide variety of chemical products. When combined with other organic liquids, the products may be utilized in the surface modification of plastics, rubber, textiles, and the like.

A particularly desirable use would be the incorporation of the compositions of the invention in non-gloss varnishes to accomplish a flatting effect. Since the particles are not completely esterified some aggregation would take place to allow this flatting effect to occur. A completely esterified material could not act in this manner since the particle would remain completely dispersed in the varnish rather than agglomerate and "flatten" the gloss.

As indicated, the compositions of the invention are of value in improving the frictional characteristics of metal surfaces that move one with respect to the other. This would apply to force-fitted pinion gears and shafts, nuts and bolts. The coefficient of friction between such parts is immeasurably increased, particularly after the products are dried and the continuous organic liquid phase is no longer present.

The invention is hereby claimed as follows:

1. A non-aqueous silica sol consisting essentially of, as the continuous phase, a water miscible monohydric alcohol having a boiling point greater than 50° C., and as the dispersed phase 20–60% by weight of colloidal, discrete dense particles of salt-free silica which have an average particle diameter of 5–150 millimicrons, and a specific surface area of at least 20 m.$^2$/g., which silica particles have from about 50% to about 95% of their surface silanol groups hydrogen bonded by an organic water miscible hydrogen bonding agent and from about 5% to about 50% of their surface silanol groups esterified with the same water miscible alcohol which corresponds to the continuous phase, said hydrogen bonding agent having a dipole moment of at least 3.0 Debye units, and being present in a mol ratio per mol of hydrogen bonded and surface esterified silanol groups of from 10:1 to 1:1.

2. The non-aqueous silica sol of claim 1 wherein the water miscible alcohol has the structural formula:

where R is an acyclic hydrocarbon radical of from 1 to 4 carbon atoms in chain length, and $n$ is an integer of from 0 to 1 in value, with the proviso that where $n$ is 0, R is not greater than 3 carbon atoms in chain length.

3. The non-aqueous silica sol of claim 1 wherein the water miscible alcohol is 2-ethoxy ethanol.

4. A non-aqueous silica sol consisting essentially of, as the continuous phase, a water miscible alcohol having the formula:

wherein R is an acyclic hydrocarbon radical of 1–4 carbon atoms in chain length, $n$ is an integer of from 0 to 1 in value, with the proviso that where $n$ is zero, R is not greater than 3 carbon atoms in chain length, said alcohol having a boiling point greater than 90° C., and as the dispersed phase 20–40% by weight of colloidal discrete dense particles of salt-free silica which have an average particle diameter of 5–150 millimicrons, and a specific surface area of at least 120 m.²/g., which silica particles have from 65 to 95% of their surface silanol groups hydrogen bonded by an organic water miscible hydrogen bonding agent and from 5 to 35% of their surface silanol groups esterified with the same water miscible alcohol which corresponds to the continuous phase, said hydrogen bonding agent having a dipole moment of at least 3.5 Debye units, and being present in a mole ratio per mol of hydrogen bonded and surface esterified silanol groups of from 10:1 to 1:1.

5. The non-aqueous silica sol of claim 4 wherein the water miscible alcohol is 2-ethoxy ethanol.

6. The non-aqueous silica sol of claim 4 wherein the hydrogen bonding agent is dimethylformamide.

7. The process of producing a non-aqueous silica sol which comprises the steps of adding an organic water miscible hydrogen bonding agent which has a dipole moment of at least 3.0 Debye units to an aqueous salt-free silica sol containing from 20% to 60% by weight of silica to form a reaction system, with the amount of hydrogen bonding agent being present in a mol ratio per mol of surface silanol groups present in the silica particles of the silica sol of from 10:1 to 1:1, adding under vacuum to the reaction system a water miscible monohydric alcohol in an amount of from 1 to 7 volumes per volume of water present in the aqueous salt-free silica sol, said alcohol having a boiling point greater than 50° C., maintaining said vacuum and heating the reactants under conditions whereby substantially all the water is removed from the reaction system, releasing the vacuum, heating the water miscible alcohol of the formed non-aqueous silica sol containing 20–60% by weight of silica to its reflux temperature at ambient pressure and maintaining said temperature for at least ¼ hour.

8. A process of producing a non-aqueous silica sol which comprises the steps of adding an organic water miscible hydrogen bonding agent which has a dipole moment of at least 3.5 Debye units to an aqueous salt-free silica sol to form a reaction system, said silica sol containing from 20 to 60% by weight of silica, and having a specific surface area of at least 20 m.²/g., with the amount of hydrogen bonding agent being present in a mol ratio per mol of surface silanol groups present in the silica particles of the silica sol of from 10:1 to 1:1, adding to the reaction system while under pressure of from 2 to 180 millimeters of mercury, a water miscible alcohol in amount equal to from 1 to 7 volumes per volume of water present in the aqueous salt-free silica sol, said water miscible alcohol having the structural formula:

$$RO-(CH_2CH_2O-)_nH$$

where R is an acyclic hydrocarbon radical of from 1 to 4 carbon atoms in chain length, and $n$ is an integer from 0 to 1 in value, with the proviso that where $n$ is zero, R is not greater than 3 carbon atoms in chain length, maintaining said pressure and heating the reactants under conditions whereby substantially all the water is removed from the reaction system to form a non-aqueous silica sol, returning the pressure to atmospheric level, and then heating the non-aqueous silica sol containing 20–60% of silica by weight to about the reflux temperature of the water miscible alcohol at atmospheric pressure, and maintaining said temperature from ½ to 10 hours.

9. The process of claim 8 wherein the salt-free silica sol contains from 20 to 40% silica by weight, the silica has a specific surface area of at least 120 m.²/g., the water miscible alcohol is added to the reaction system in an amount from 1 to 3 volumes per volume of water present, and the non-aqueous silica sol is heated at the reflux temperature of the water miscible alcohol for a period of from 1 to 5 hours after releasing the vacuum pressure.

10. The process of claim 8 wherein the water miscible alcohol is 2-ethoxy ethanol and the hydrogen bonding agent is dimethylformamide.

11. The process of claim 8 where the hydrogen bonding agent is added to the water miscible alcohol.

References Cited

UNITED STATES PATENTS 2,383,653   8/1945   Kirk _____ 252—309
2,974,105   3/1965   Iler _____ 252—309

LEON D. ROSDOL, *Primary Examiner.*

J. GREENWALD, *Examiner.*

R. D. LOVERING, *Assistant Examiner.*

UNITED STATES PATENT OFFICE
CERTIFICATE OF CORRECTION

Patent No. 3,351,561  November 7, 1967

William L. Albrecht et al.

It is certified that error appears in the above identified patent and that said Letters Patent are hereby corrected as shown below:

Column 1, line 22, "organsols" should read -- organosols --. Column 4, line 16, "gels" should read -- sols --; line 26, after "Since" insert -- silica --; line 51, "$SiO_2Na_2O$" should read -- $SiO_2:Na_2O$ --. Column 6, line 17, "acylic" should read -- acyclic --.

Signed and sealed this 23rd day of September 1969.

(SEAL)

Attest:

Edward M. Fletcher, Jr.

Attesting Officer

WILLIAM E. SCHUYLER, JR.

Commissioner of Patents